United States Patent [19]
Naito et al.

[11] Patent Number: 5,569,887
[45] Date of Patent: Oct. 29, 1996

[54] LOAD CELL FOR DETECTING VIBRATIONS AND WEIGHING DEVICE COMPRISING SAME

[75] Inventors: Kazufumi Naito; Yoshihiro Nakamura; Hiroyuki Konishi, all of Shiga, Japan

[73] Assignee: Ishida Co., Ltd., Japan

[21] Appl. No.: 390,346

[22] Filed: Feb. 17, 1995

[30] Foreign Application Priority Data

Mar. 9, 1994 [JP] Japan .................................. 6-066589

[51] Int. Cl.⁶ ............................ G01G 21/10; G01G 3/08; G01L 1/04
[52] U.S. Cl. ...................... 177/184; 177/229; 73/862.634
[58] Field of Search ....................................... 177/156, 184, 177/187, 185, 188, 229; 73/862.634, 862.639

[56] References Cited

U.S. PATENT DOCUMENTS

| | | | |
|---|---|---|---|
| 4,593,778 | 6/1986 | Konishi et al. ........................ | 177/185 |
| 5,052,505 | 10/1991 | Naito et al. ............................ | 177/229 |
| 5,117,929 | 6/1992 | Nakamura et al. .................... | 177/185 |
| 5,154,247 | 10/1992 | Nishimura et al. .................... | 177/211 |

*Primary Examiner*—Brian W. Brown
*Assistant Examiner*—Randy W. Gibson
*Attorney, Agent, or Firm*—Majestic, Parsons, Siebert & Hsue

[57] ABSTRACT

A weighing device has not only a scale cell which weighs an object and outputs a weight signal indicative of the measured weight value but also a vibration-detecting load cell for detecting the vibrations of the floor to which the scale cell is set such that the effects of the floor vibrations can be subtracted from the weight value detected by the scale cell. The vibration-detecting load cell has attenuation-adjusting members adhesively attached to strain-generating parts of its load-sensitive element such that the attenuation constant of the load cell is thereby increased at least by a factor of 2. The usable dynamic range of the load cell can thus be increased while the load cell is kept compact. Butyl rubber members can be used for this purpose.

9 Claims, 6 Drawing Sheets

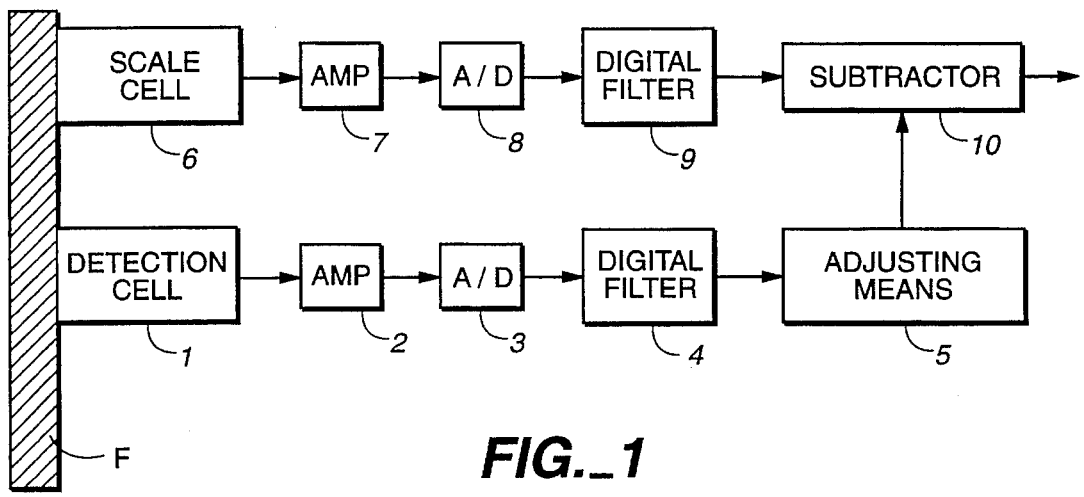
FIG._1
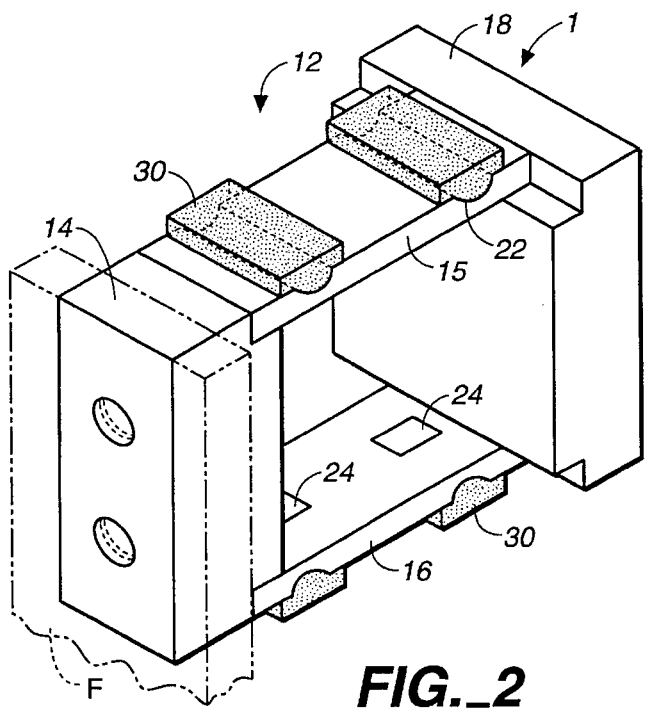
FIG._2
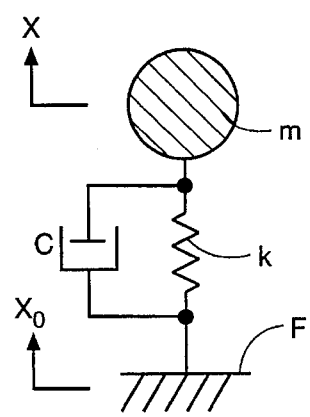
FIG._3

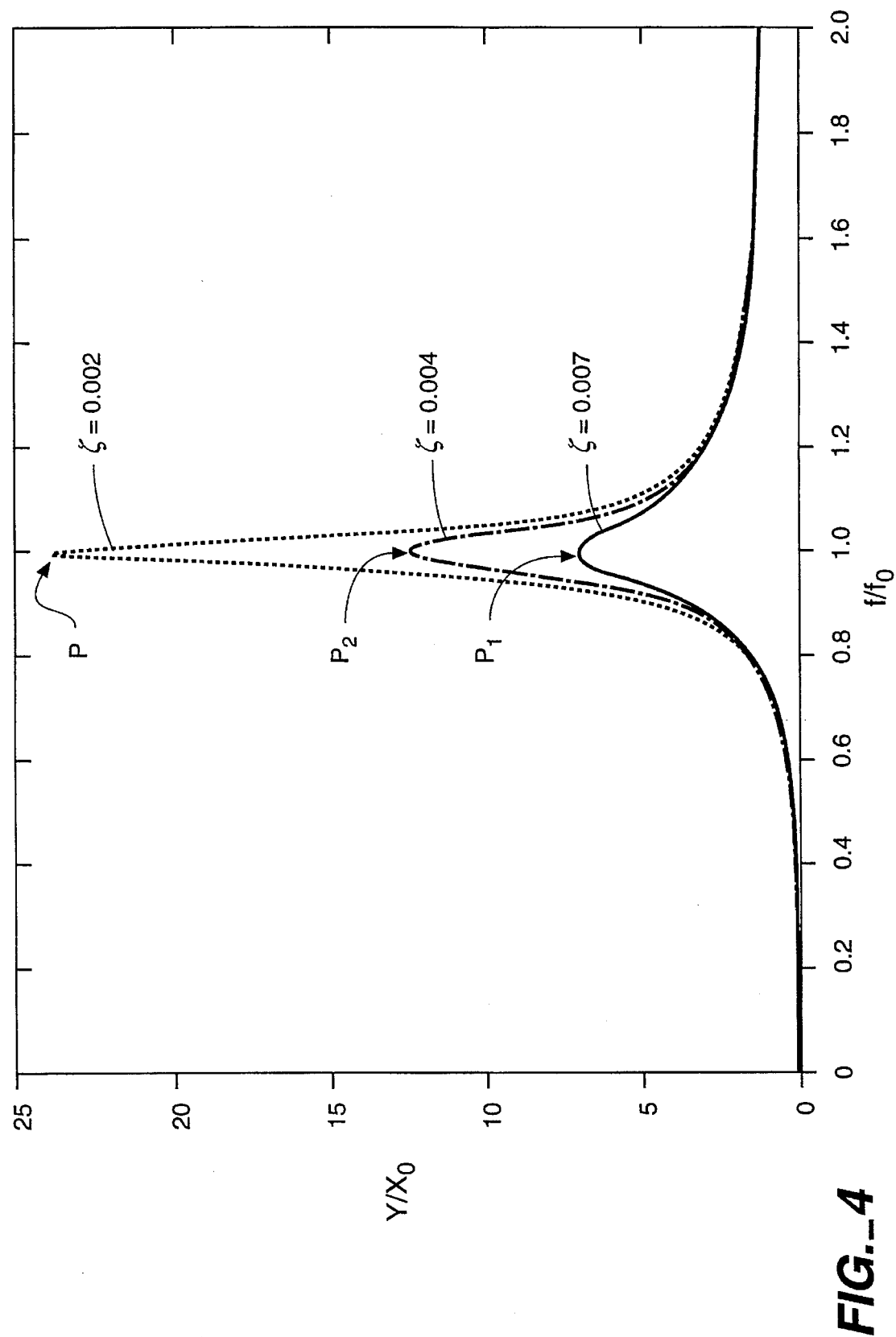
FIG._4

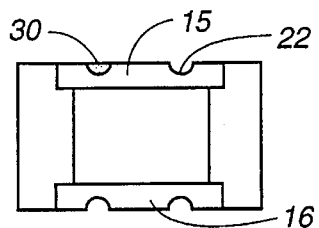
*FIG._5A*
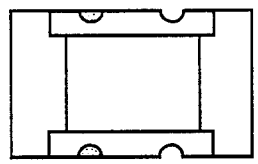
*FIG._5C*
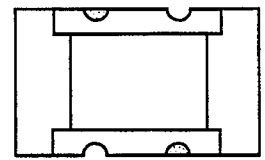
*FIG._5E*
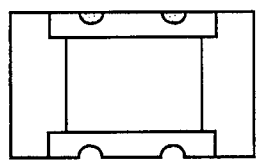
*FIG._5B*
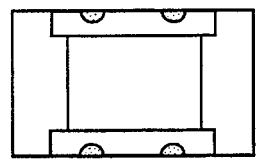
*FIG._5D*
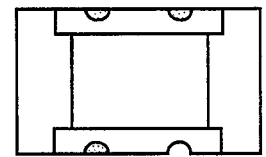
*FIG._5F*
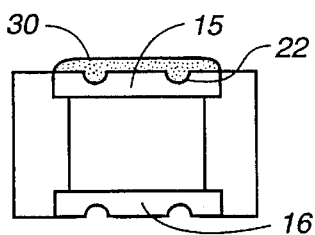
*FIG._6A*
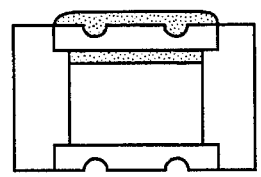
*FIG._6C*
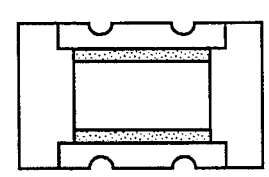
*FIG._6E*
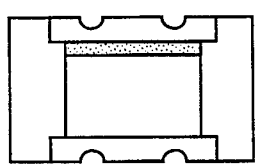
*FIG._6B*
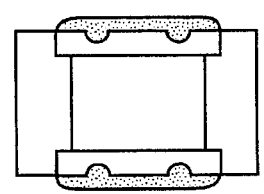
*FIG._6D*
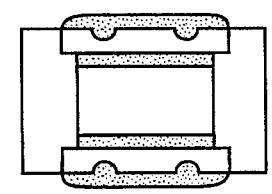
*FIG._6F*

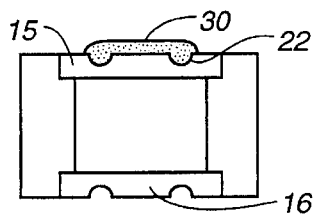
FIG._7A
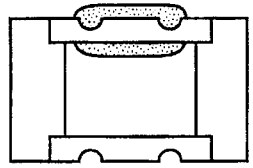
FIG._7C
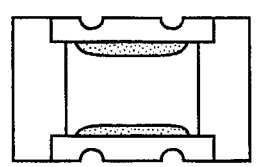
FIG._7E
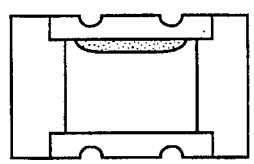
FIG._7B
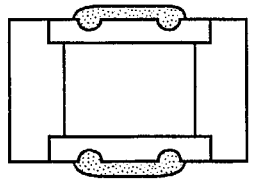
FIG._7D
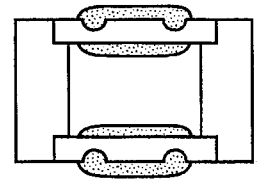
FIG._7F
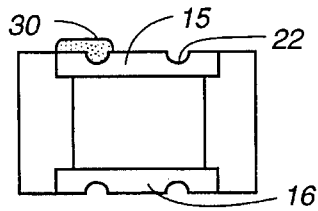
FIG._8A
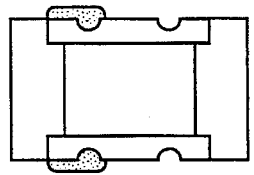
FIG._8E
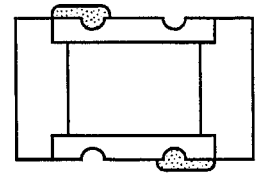
FIG._8I
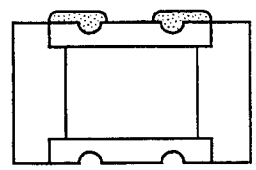
FIG._8B
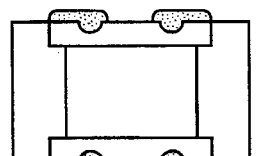
FIG._8F
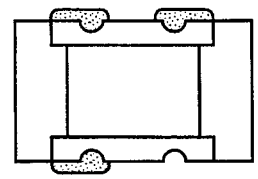
FIG._8J
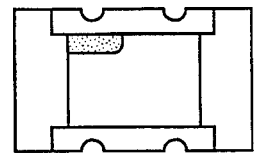
FIG._8C
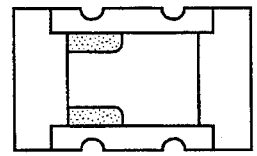
FIG._8G
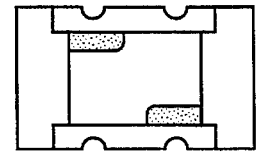
FIG._8K
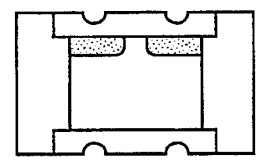
FIG._8D
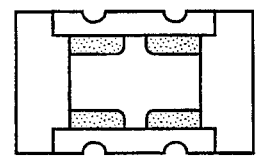
FIG._8H
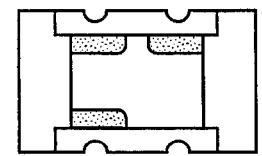
FIG._8L

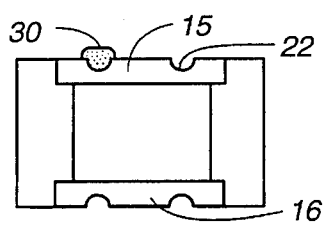
FIG._9A
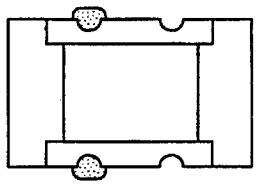
FIG._9G
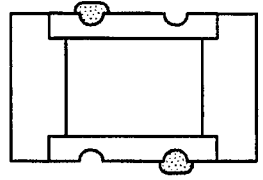
FIG._9M
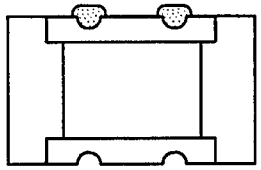
FIG._9B
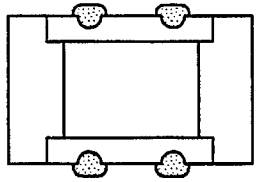
FIG._9H
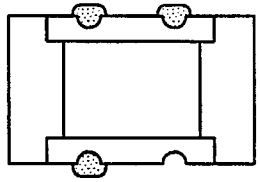
FIG._9N
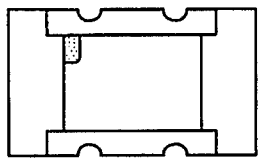
FIG._9C
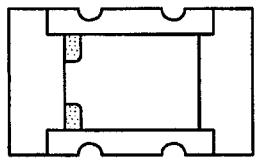
FIG._9I
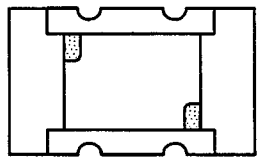
FIG._9O
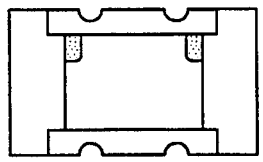
FIG._9D
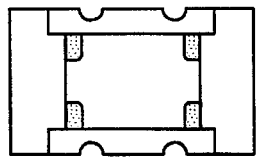
FIG._9J
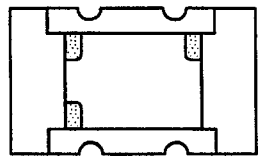
FIG._9P
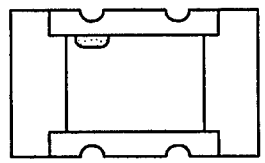
FIG._9E
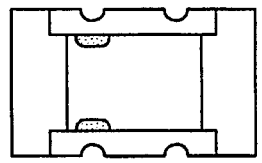
FIG._9K
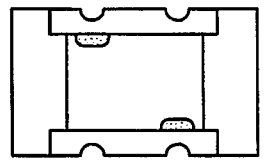
FIG._9Q
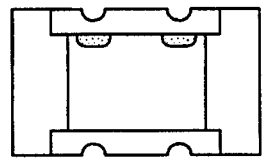
FIG._9F
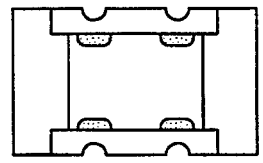
FIG._9L
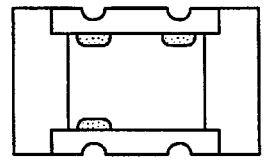
FIG._9R

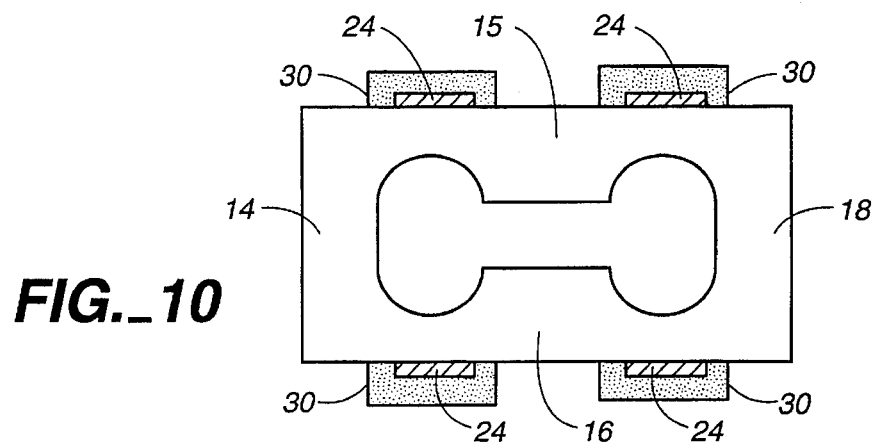
FIG._10
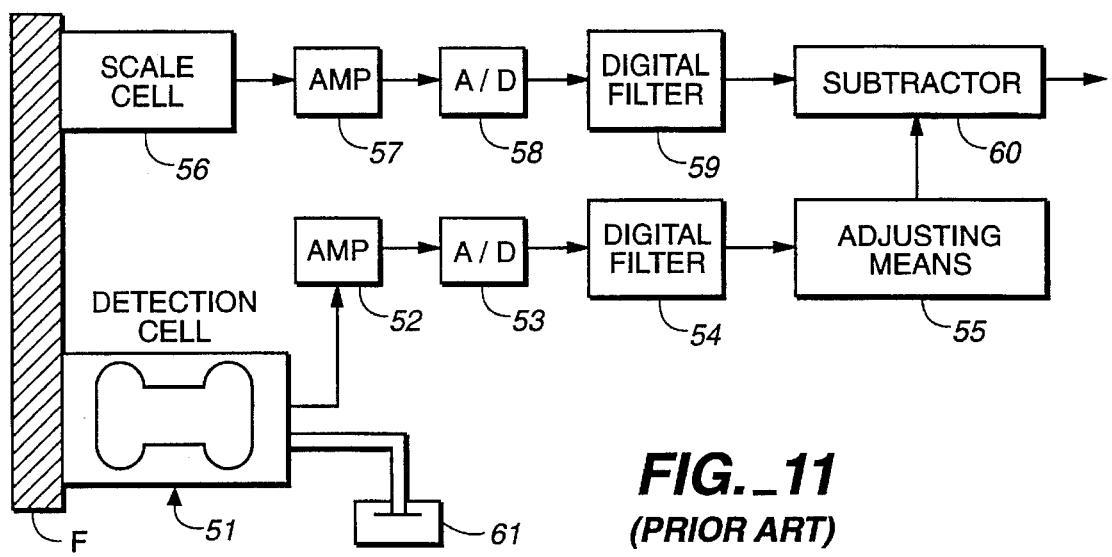
FIG._11
(PRIOR ART)
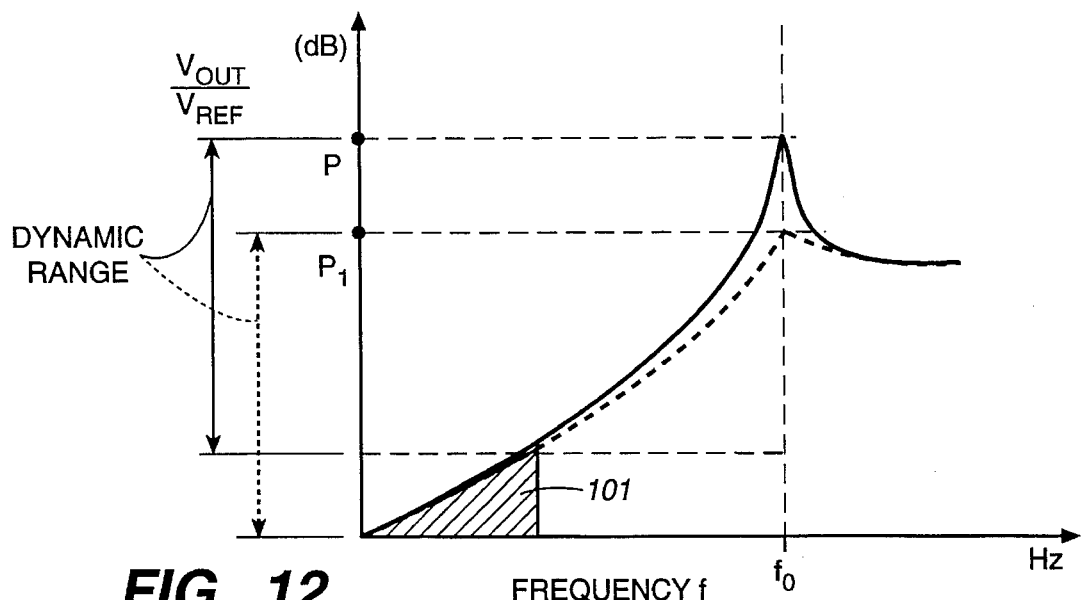
FIG._12

5,569,887

1

LOAD CELL FOR DETECTING VIBRATIONS AND WEIGHING DEVICE COMPRISING SAME

BACKGROUND OF THE INVENTION

This invention relates to a weighing device which is set on a floor and comprises a load cell for detecting the floor vibrations in the vertical direction.

A weighing device is subjected to many kinds of vibrations, wherever it is installed, due to environmental vibrations of the ground, building, floor and/or the table (hereinafter generally referred to as the floor vibrations). When objects are weighed by such a weighing device, components of such vibrations are added to the weight signals outputted by the weighing device. In order to effect high-speed, high-precision weighing, it is essential to make corrections on weight signals by subtracting such vibration components therefrom.

Since floor vibrations generally have lower frequencies than the mechanical vibrations which are caused when an object to be weighed is placed on the weighing device, a low-pass filter with a low cutoff frequency may be used in order to eliminate the components of floor vibrations from weight signals, but the response becomes slower if such a low-pass filter is used, and the overall efficiency of the weighing process is adversely affected. For this reason, there have been attempts at eliminating the floor vibration components in some other way such that the cutoff frequency of the filter can be set higher and the speed of weighing can be increased.

FIG. 11 is a block diagram of a prior art weighing device having a weight-measuring load cell (or a scale cell) 56 and a vibration-detecting load cell (or a detection cell) 51 installed on the same floor F. Analog weight signals indicative of weights measured by and outputted from the scale cell 56 are passed through an amplifier 57 and converted into digital signals by an analog-to-digital converter (A/D) 58. Effects of mechanical vibrations are removed therefrom by a digital filter 59 before the digital weight signals are inputted to a subtractor 60. Analog signals indicative of the vibrations of the floor F outputted from the detection cell 51 are similarly processed, that is, they are passed through an amplifier 52, converted into digital signals by an analog-to-digital converter (A/D) 53 and inputted to the subtractor 60 after appropriate adjustments are effected thereon by an adjusting means 55. As explained, for example, in U.S. Pat. No. 5,117,929 issued Jun. 2, 1992, the adjusting means 55 may comprise a multiplier for making adjustments necessitated by the difference in sensitivity between the scale cell 56 and the detection cell 51. The subtractor 60 serves to subtract the effects of the floor vibrations detected by the detection cell 51 from the weight signals from the scale cell 56 to thereby output corrected weight signals which are free from the effects of the floor vibrations.

It now goes without saying that the A/D converters 53 and 58 must be able to convert vibration components of the floor F accurately and without allowing them to go over their range because, if otherwise, correct values would not be obtained after the signals are passed through the digital filters 54 and 59. Now, the usable dynamic range of the A/D converters 53 and 58 (or the range of input voltage determined by the number of bits corresponding to the resolution) is determined by their frequency (f) characteristic as shown by the log-log graph in FIG. 12, wherein $V_{ref}$ indicates the output when the transfer function is 1. In general, if the

2 amplitude of the floor vibration, the relative displacement of an object set on the floor with respect thereto and the attenuation constant of the vibration are denoted by $A_0$, Y and $\zeta$, respectively, the relationship $(Y/A_0)=1/(2\zeta)$ holds at the characteristic frequency $f_0$ (such as 90 Hz). Accordingly, the peak value P at the characteristic frequency $f_0$ becomes higher if the attenuation constant $\zeta$ is made smaller, and the upper limit of the usable dynamic range of the A/D converters 53 and 58 is determined by this peak value P.

If a large force including high frequency components is experienced from the floor, a very large signal proportional to the peak value P is outputted from the detection cell 51. In order to convert such a signal into a digital signal without allowing it to go beyond the range of the A/D converter 53, its range of input voltage must be increased accordingly. Since there is a limit to the resolution (or the number of bits) of the A/D converter 53, however, this means that the resolution of the converter 53 becomes low in the lower frequency range of interest, and hence that the effects of floor vibrations cannot be eliminated accurately. One method of obtaining sufficiently high resolution while keeping the range of input voltage wide enough would be to reduce the peak value P. If the peak value P is reduced (say, to $P_1$ as shown in FIG. 12), the resolution becomes higher and accurate detection becomes possible in a region of lower floor vibration frequencies (say, of about 5–15 Hz shown at 101).

As a means for reducing the peak value P, it has been known to connect an oil dumper (as disclosed, for example, in Japanese Utility Model Publication Jikko 59-593, and shown at 61 in FIG. 11) to the detection cell 51 to thereby increase its vibration attenuation constant and to increase its usable dynamic range.

Weighing devices using such a prior art detecting cell are difficult to use, however, because it is cumbersome to attach a dumper to the detecting cell and it is difficult to set the oil damper appropriately such that a desired detection attenuation constant is obtained. Moreover, the use of an oil dumper makes it difficult to design a compact detecting cell because of limitations placed on the shape of the oil dumper.

SUMMARY OF THE INVENTION

It is therefore an object of this invention to eliminate the problems with prior art vibration-detecting load cells of the type described above.

More particularly, it is an object of this invention to provide a vibration-detecting load cell which can be made compact and is capable of increasing the usable dynamic range, as well as a weighing device using such a detecting cell.

A vibration-detecting load cell embodying this invention, with which the above and other objects can be accomplished, may be characterized as comprising a deformable load-sensitive element set to a floor and capable of outputting signals indicative of the vibrational vertical displacements of the floor, as well as strain sensors for detecting deformations of this load-sensitive element, this load-sensitive element comprising not only a fixed part supported by the floor, upper and lower beams and a weight supported by the fixed part through the upper and lower beams, but also attenuation-adjusting members adhesively attached at least to strain-generating parts of the beams such that the vibration attenuation constant of the load cell will be increased, say, by a factor of 2 or more. With a load cell thus formed such that its vibration attenuation constant is significantly increased, its usable dynamic range can be increased without increasing its size.

A weighing device embodying this invention may be characterized as comprising a vibration-detecting load cell according to this invention as described above.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic block diagram of a weighing device embodying this invention;

FIG. 2 is a schematic diagonal view of a vibration-detecting load cell embodying this invention;

FIG. 3 is a drawing of a general vibrating system for explaining the principle of the invention;

FIG. 4 is a graph for showing the effects of a drop in the peak value at the characteristic frequency of a vibration-detecting load cell;

FIGS. 5A–5F (collectively referred to as FIG. 5) show different manners in which attenuation-adjusting members can be attached to the load-sensitive element of a vibration-detecting load cell according to this invention;

FIGS. 6A–6F (collectively referred to as FIG. 6) show other different manners in which attenuation-adjusting members can be attached to the load-sensitive element of a vibration-detecting load cell according to this invention;

FIGS. 7A–7F (collectively referred to as FIG. 7) show still other different manners in which attenuation-adjusting members can be attached to the load-sensitive element of a vibration-detecting load cell according to this invention;

FIGS. 8A–8L (collectively referred to as FIG. 8) show still other different manners in which attenuation-adjusting members can be attached to the load-sensitive element of a vibration-detecting load cell according to this invention;

FIGS. 9A–9R (collectively referred to as FIG. 9) show still other different manners in which attenuation-adjusting members can be attached to the load-sensitive element of a vibration-detecting load cell according to this invention;

FIG. 10 shows a manner of attaching attenuation-adjusting members to a vibration-detecting load cell of a different kind;

FIG. 11 is a schematic block diagram of a prior art weighing device with a load cell for detecting vibrations of the floor; and FIG. 12 is a graph for showing frequency characteristics of load cells for detecting floor vibrations.

DETAILED DESCRIPTION OF THE INVENTION

FIG. 1 shows a weighing device according to this invention characterized as having a vibration-detecting load cell (or a detection cell) 1 according to this invention and a weight-measuring load cell (or a scale cell) 6 installed on the same floor F. In other respects, the circuitry for this weighing device is essentially as shown in FIG. 11, that is, an analog weight signal indicative of a weight measured by and outputted from the scale cell 6 is passed through an amplifier 7 and converted into a digital signal by an analog-to-digital converter (A/D) 8, and effects of mechanical vibrations are removed therefrom by a digital filter 9 before the digital weight signal is transmitted to a subtractor 10. An analog signal indicative of the vibrations of the floor F outputted from the detection cell 1 according to this invention is similarly passed through an amplifier 2, converted into a digital signal by an analog-to-digital converter (A/D) 3 and inputted to the subtractor 10 after appropriate adjustments are effected thereon by an adjusting means 5 of a known kind. The subtractor 10 serves to subtract the effects of the floor vibrations detected by the detection cell 1 from the weight signals received from the scale cell 6 to thereby output a corrected weight signal which is free of the effects of the floor vibrations.

The vibration-detecting load cell 1, according to one embodiment of the invention, comprises a deformable load-sensitive element 12 as shown in FIG. 2, adapted to be attached to or set on a floor F (in a broad sense of the word, including a frame or the like attached to or set on "a floor" in a narrower sense of the word) and capable of undergoing a strain according to the vertical displacement of the floor F. The load-sensitive element 12 comprises a fixed part 14 which is supported by the floor F, an upper beam 15 and a lower beam 16 which are both horizontal with the upper beam 15 extending above the lower beam 16, and a weight 18 which is supported by the fixed part 14 through the two beams 15 and 16. Notches 22 are formed on the upper surface of the upper beam 15 and the lower surface Of the lower beam 16, and strain sensors (or strain gauges of a known kind) 24 are attached to the lower surface of the upper beam 15 and the upper surface of the lower beam 16 opposite these notches 22. Since the portions of the beams 15 and 16 where the notches 22 are formed are where the beams 15 and 16 undergo a strain most significantly, these parts will be hereinafter referred to as the strain-generating parts of the beams 15 and 16. Although not shown in FIG. 2, wires are connected to these strain gauges 24 to form a bridge circuit through which vibration-detection signals are outputted, as known well in the load cell art.

If the peak value P of the vibration-detecting signals at the characteristic frequency of the load-sensitive element 12 is high, there may be an overflow from the dynamic range of the A/D converter 3, as explained above. In order to avoid such an overflow from the range, what are herein referred to as attenuation-adjusting members 30 are adhesively attached according to this invention to the load-sensitive element 12, or at the aforementioned strain-generating parts of the beams 15 and 16 so as to increase the attenuation constant of the detection cell 1. The peak value P at the characteristic frequency is thereby reduced, and the usable dynamic range of the vibration-detecting load cell 1 is increased. FIG. 2 shows an example wherein attenuation-adjusting members 30 with large attenuation constant $\zeta$ are attached each inside and over one of the notches 22 on the upper surface of the upper beam 15 or the lower surface of the lower beam 16. Throughout herein, it will be taken for granted that the vibration characteristics (such as the characteristic frequency and the peak value) of the load-sensitive element 12 are approximately the same as those of the detection cell 1 with the strain sensors 24 attached thereto.

Consider a vibrating system in general, as shown in FIG. 3, having mass m, viscosity coefficient c and spring constant k. Since the attenuation constant $\zeta$ of such a system is given by $\zeta = c/2\sqrt{(mk)}$, a material with large attenuation constant $\zeta$ means a material with small spring constant k and large viscosity coefficient c. In other words, desirable materials for this purpose should have small Young's modulus and small restoring force (spring constant) so as to have small restraining force against deformation but provide a large restraining force against time rate (or speed) of deformation. Adhesive materials such as butyl rubber with no or little crosslinking are favorably usable.

Although it has been known to apply a butyl rubber coating on strain sensors on a load cell (as disclosed, for example, in U.S. Pat. No. 5,052,505 issued Oct. 1, 1991 and assigned to the present assignee), this was done only for the purpose of protecting the sensors against moisture. If an increased amount of butyl rubber is applied or butyl rubber with high viscosity is used in order to increase the attenuation constant $\zeta$ for quickly attenuating the vibration of a load cell, however, there is the risk of increasing the so-called "creep" of the load cell, which is the increase in the deformation of a material with time when a constant load or force is applied under the condition of a constant temperature. In the case of a load cell adapted to output a direct current signal in response to an applied load, such as the scale cell 6 of the weighing device of FIG. 1, the creep is a serious problem because it affects the accuracy of the weighing in an adverse way. For this reason, butyl rubber coating used to be applied only to load cells of sufficiently large capacity such that the effects of creep would be negligible. In other words, the vibration-attenuation effect of the scale cell 6 by the use of butyl rubber must be kept small and its attenuation constant $\zeta$ is kept hardly greater than if there is no coating of butyl rubber. For example, if the required accuracy of weighing against the largest load is 0.005 the effect of the creep is typically kept to about 0.002, that is, less than one-half of the required accuracy in weighing.

Because the vibration-detecting load cell 1 of the weighing device shown in FIG. 1 is unlike the scale cell 6 in that it is for the purpose of detecting only the alternating current component, its accuracy is not significantly affected by the phenomenon of creep. In other words, the creep of the detection cell 1 may increase if attenuation-adjusting members 30 of butyl rubber are attached thereto to increase its attenuation constant $\zeta$, but this hardly affects at all the accuracy of its detection of floor vibrations. Although the direct current component of its output (corresponding to the zero-point) corresponding to the load from the weight 18 may vary due to the creep, its effect can be compensated for if, for example, zero-point adjustments are carried out as taught in U.S. Pat. No. 5,117,929 issued Jun. 2, 1992.

The attenuation-adjusting members 30 of butyl rubber according to this invention are characterized as having a large attenuation constant such that the attenuation constant $\zeta$ of the detection cell 1 will be increased by a factor of 2 or more by this attachment. If the attenuation constant without any butyl rubber members is $\zeta=0.002$, for example, use may be made of butyl rubber members capable of increasing the attenuation constant to, say, $\zeta=0.007$.

Next will be explained the relationship between the attenuation constant $\zeta$ and the transfer function H(s) which represents the relationship between a system input $X_0$ indicating the floor displacement and a system output Y indicating the output from a detection cell for the floor vibrations. Let us consider, for this purpose, the one-dimensional vibrating system shown in FIG. 3, of which the equation of motion may be expressed as follows:

$$m\ddot{x}+c(\dot{x}-\dot{x}_0)+k(x-x_0)=0 \quad (1)$$

where m is the mass on the free end of the detection cell, k is its spring constant, c is its coefficient of viscosity, x is the displacement of its free end and $x_0$ is the displacement of the floor F. If the relative displacement y is defined by $y=x-x_0$, the equation above is transformed as follows:

$$m\ddot{y}+c\dot{y}+ky=-m\ddot{x}_0. \quad (2)$$

By Laplace transformation of (2), one obtains:

$$(ms^2+cs+k)Y=-ms^2X_0,$$

and since the characteristic frequency $\Omega=\sqrt{(k/m)}$ and $\zeta=c/2\sqrt{(mk)}$, this gives:

$$Y/X_0=-ms^2/((ms^2+cs+k)=-s^2/(s^2+2(\Omega s+\Omega^2)).$$

If the transfer function which represents the relationship between the input into and output out of the system is written as H(s) and s is set equal to $s=j\omega$ where $j=\sqrt{(-1)}$ and $\omega$ is the vibration frequency of the floor, one obtains:

$$\begin{aligned}H(j\omega) &= Y(j\omega)/X_0(j\omega) = \omega^2/\{(\Omega^2-\omega^2)+j2\zeta\Omega\omega\} \quad (3)\\ &= \omega^2\{(\Omega^2-\omega^2)-j(2\zeta\Omega\omega)\}/\{(\Omega^2-\omega^2)^2+(2\zeta\Omega\omega)^2\}\\ &|Y(j\omega)/X_0(j\omega)| = \omega^2/\{(\Omega^2-\omega^2)^2+(2\zeta\Omega\omega)^2\}^{1/2}\\ &= (\omega/\Omega)^2/\{(1-(\omega/\Omega)^2)^2+(2\zeta\omega/\Omega)^2\}^{1/2}.\end{aligned}$$

In FIG. 4 which represents Equation (3), the dotted line for $\zeta=0.002$ corresponds to a situation where there is no butyl rubber and the solid line for $\zeta=0.007$ corresponds to a situation where butyl rubber members are attached, showing that these butyl rubber members have the effect of reducing the peak value P at the characteristic frequency of the detection cell 1 ($f=f_0$) to $P_1$ such that its usable dynamic range is enlarged and the accuracy in the detection of vibrations by the weighing device is improved. The chain line in FIG. 4 corresponds to $\zeta=0.004$ (or twice the value when there was no butyl rubber member). The peak value $P_2$ of this curve is one half of P. According to this invention, butyl rubber members are used such that the attenuation constant $\zeta$ is increased by a factor of 2 or greater.

Examples of manners in which butyl rubber members 30 may be attached to various parts of the load-sensitive element 12 are shown in FIGS. 5–9. Examples wherein butyl rubber members 30 are placed only inside the notches 22 are illustrated in FIGS. 5A–5F. FIG. 5A shows an example wherein only one butyl rubber member 30 is used. FIG. 5B shows an example where two butyl rubber members are used inside the two notches on one of the beams n(the upper beam 15). FIGS. 5C–5F show examples where two or more butyl rubber members are used on both upper and lower beams 15 and 16. FIGS. 6A–6F show examples where a butyl rubber member covers entirely at least one surface of at least one of the beams 15 and 16. FIG. 6A is an example where a butyl rubber member 30 covers the upper surface of the upper beam 15 completely, FIG. 6B is an example where a butyl rubber member 30 covers the lower surface of the upper beam 15 completely, and FIG. 6C is an example where two butyl rubber members are used to completely cover both the upper and lower surfaces of the upper beam 15. FIGS. 6D–6F are examples where the upper and lower beams 15 and 16 are each covered as shown in FIGS. 6A–6C, respectively. It is to be remembered that the strain sensors 24 may be well protected against moisture if they are covered by butyl rubber.

FIGS. 7A–7F show examples where each butyl rubber member 30 is attached to a center portion of the upper or lower beam 15 or 16. FIG. 7A is an example where it is attached to a center portion on the upper surface of the upper beam 15 including the notches 22, FIG. 7B is an example where it is attached to a center portion on the lower surface of the upper beam 15 including its strain-generating parts, and FIG. 7C is an example where two butyl rubber members cover center portions of both the upper and lower surfaces of the upper beam 15.

FIGS. 7D–7F are examples where the upper and lower beams 15 and 16 are each covered as shown in FIGS. 7A–7C, respectively. FIGS. 8A–8L show examples where one or more thicker butyl rubber members 30 are used to cover one or more strain-generating parts of the beams 15 and 16 extensively. FIGS. 8A–8D show examples where one or two butyl rubber members are attached to only one of the beams 15 and 16. FIGS. 8E–8L show examples where two or more butyl rubber members are attached to both beams 15 and 16. FIGS. 9A–9R show examples where small butyl rubber members are attached locally. FIGS. 9A–9F show examples where one or two small butyl rubber members are attached locally to only one of the beams 15 and 16. FIGS. 9G–9R show examples where 2–4 butyl rubber members are attached locally to inner and/or outer surfaces of both upper and lower beams 15 and 16.

This invention has been described above only with reference to a load cell of the type structured as shown in FIG. 2, but it is to be noted that butyl rubber members of the kind described above may be attached to a unistructural load cell of a type disclosed, for example, in aforesaid U.S. Pat. No. 5,052,505, comprising a cantilevered single load-sensitive element with an opening. FIG. 10 shows such a load cell of which various parts are indicated by the same numerals used in FIG. 2 to indicate corresponding parts. Butyl rubber members 30 may be attached to such a load cell not only in the manner shown in FIG. 10 but also in any of the manners shown in FIGS. 5–9.

In summary, this invention teaches the advantage of using butyl rubber members for the specific purpose of increasing the vibration-attenuating property of a load cell by increasing its attenuation. constant $\zeta$ by a factor of 2 or greater. As compared to the prior art method of using an oil dumper for the same purpose, the butyl rubber members according to the present invention are much easier to attach to selected parts of any load cell, and the load cell remains compact even after such members are attached. Moreover, the attenuation constant $\zeta$ can be freely and easily adjusted by changing the thickness of the butyl rubber members or the positions and/or the areas for the attachment. It should be remembered, however, that the effects of temperature on the characteristics of the butyl rubber material must be properly taken into account.

Although butyl rubber has been principally mentioned as the material for the attenuation-adjusting member, any other material with a high attenuation constant $\zeta$ such as resins with high viscosity may be used for this purpose.

What is claimed is:

1. A load cell comprising:

a load-sensitive element set to a floor, having strain-generating parts and being thereby capable of undergoing deformation according to vertical displacement of said floor, said load-sensitive element comprising a fixed part supported by said floor, an upper beam, a lower beam and a weight part which is supported by said fixed part through said upper and lower beams;

strain sensors attached to said strain-generating parts of said load sensitive element for measuring strains of said load-sensitive element; and attenuation-adjusting members which are adhesively attached to said strain-generating parts of said load sensitive element, said attenuation-adjusting members being capable of increasing the vibration-attenuation constant of said load cell.

2. The load cell of claim 1 wherein said attenuation-adjusting members increase the vibration-attenuation constant of said load cell by a factor of at least 2.

3. The load cell of claim 1 wherein said attenuation-adjusting members comprise butyl rubber.

4. The load cell of claim 2 wherein said attenuation-adjusting members comprise butyl rubber.

5. The load cell of claim 1 wherein said strain-generating parts are formed on said upper and lower beams.

6. A weighing device comprising:

a load cell which is set to a floor for measuring the weight of an object and outputting a weight signal indicative of said weight;

a vibration-detecting cell for detecting vibrations of said floor and outputting floor-vibration signal indicative of said vibrations; and subtractor means for outputting a vibration-corrected weight signal indicative of the weight of said object in the absence of effects of said vibrations by receiving said weight signal and said floor-vibration signal;

said vibration-detecting cell comprising:

a load-sensitive element set to said floor, having strain-generating parts and being thereby capable of undergoing deformation according to vertical displacement of said floor, said load-sensitive element comprising a fixed part supported by said floor, an upper beam, a lower beam and a weight part which is supported by said fixed part through said upper and lower beams;

strain sensors attached to said strain-generating parts of said load sensitive element for measuring strains of said load-sensitive element; and attenuation-adjusting members which are adhesively attached to said strain-generating parts of said load sensitive element, said attenuation-adjusting members being capable of increasing the vibration-attenuation constant of said vibration-detecting cell.

7. The weighing device of claim 6 wherein said attenuation-adjusting members increase the vibration-attenuation constant of said vibration-detecting cell by a factor of at least 2.

8. The weighing device of claim 6 wherein said attenuation-adjusting members comprise butyl rubber.

9. The weighing device of claim 7 wherein said attenuation-adjusting members comprise butyl rubber.

* * * * *